United States Patent [19]

Scoccia et al.

[11] Patent Number: 4,989,499
[45] Date of Patent: Feb. 5, 1991

[54] AIR PRESSURE CONTROL

[75] Inventors: Ardeean Scoccia, West Amherst; Karma V. Sangwan, East Amherst; George H. Johnson, Newfane, all of N.Y.

[73] Assignee: General Motors Corporation, Detroit, Mich.

[21] Appl. No.: 446,249

[22] Filed: Dec. 5, 1989

[51] Int. Cl.⁵ .............................................. B60H 1/32
[52] U.S. Cl. .............................................. 98/1.5
[58] Field of Search ................ 98/1.5, 2, 2.01, 2.18

[56] References Cited

U.S. PATENT DOCUMENTS

| | | | |
|---|---|---|---|
| 2,578,539 | 11/1951 | Green | 98/1.5 |
| 3,392,654 | 7/1968 | Grehier | 98/2.18 X |
| 3,750,555 | 8/1973 | Götz | 98/2.01 |
| 3,911,801 | 10/1975 | Stolz | 98/2.12 |
| 4,413,550 | 11/1983 | Piano | 98/2 |
| 4,691,623 | 9/1987 | Mizusawa | 98/2.18 |
| 4,788,903 | 12/1988 | Johnson | 98/1.5 |

FOREIGN PATENT DOCUMENTS

2711816 9/1978 Fed. Rep. of Germany .

*Primary Examiner*—Harold Joyce
*Attorney, Agent, or Firm*—Mark A. Navarre

[57] ABSTRACT

An air pressure control system for the passenger compartment of a vehicle including an open-loop for generating an open-loop valve position command, a closed-loop for generating a closed-loop correction signal, and a valve control for positioning a valve as a combined function of the open-loop position command and the closed-loop correction command, thereby regulating the flow of air from the passenger compartment and the compartment pressure.

20 Claims, 6 Drawing Sheets

AIR PRESSURE CONTROL

An electronically controlled body airflow exit system which provides improved air pressure control in the passenger compartment of a vehicle is disclosed.

BACKGROUND OF THE INVENTION

The climate control systems for passenger compartments of vehicles often have a limited ability to maintain the comfort of the vehicle passengers. One of the difficult to eliminate factors which causes passenger discomfort is the presence of unwanted drafts in the vehicle. By design, most passenger compartments of vehicles are not air tight. As a result, outside air is able to infiltrate the vehicle through various leakage points and cause drafts, especially when the vehicle is traveling at highway speeds. These drafts may cause passenger discomfort and interfere with the desired circulation patterns of the climate control system. Although the drafts are most often felt when the vehicle is traveling at high speeds, high velocity winds may cause drafts when the vehicle is standing still.

One known method to solve the problem of drafts in the vehicle is to pressurize the passenger compartment. One example is disclosed in the U.S. Pat. No. 4,788,903, to Johnson issued Dec. 6, 1988, and assigned to the assignee of the present invention. The intent is to maintain a constant positive pressure, relative to the outside ambient pressure. As long as a positive pressure is maintained inside the passenger compartment of the vehicle, the infiltration of drafts will be minimized. However, the previous solutions are limited in several respects. First, their ability to maintain a substantially constant pressure is limited because of the simplicity of the control structure and the large number of unaccounted for variables in the system. A second limitation is the inability to accurately determine the outside ambient air pressure. A third limitation is the inability to control the passenger compartment pressure when the vehicle is not moving.

Another problem often causing passenger discomfort in a vehicle is the sudden pressure increase in the passenger compartment when a door is closed. This sudden pressure increase may occur when a passenger is in a vehicle with all the windows up and only one door open. When the door that was open is closed, it acts as an air ram, forcing air into the passenger compartment. With this influx of air into the passenger compartment comes a sharp increase of pressure in the compartment. This phenomenon may cause passenger discomfort.

SUMMARY OF THE PRESENT INVENTION

The present invention is an improved air pressure control apparatus for the passenger compartment of a vehicle with a climate control system, such as a heater, vent, and/or air conditioning system. The pressure control system has a positionable valve which regulates the compartment air pressure to a desired value by controlling the cross-sectional area of the air exit locations. The apparatus generates an open-loop position command as a function of the climate control system setting, the vehicle speed, and the blower speed. The apparatus also has a closed-loop where it measures the actual compartment air pressure, relative to the outside air pressure, and compares that pressure to the desired value to generate an error signal. A control means positions the valve as a combined function of the open-loop position command and the closed-loop error signal.

Through the above process, the invention provides improved air pressure control of the passenger compartment. The combination of the open-loop command and closed-loop feedback structure provides a more complex controller which can maintain a more accurate control of the system. In addition, the accounting for additional variables, such as vehicle speed, climate control system setting-such as heat, vent, air conditioning (AC), and/or defrost-and blower speed help make a more accurate system because all of these additional variables affect the passenger compartment pressure.

In certain embodiments of the invention, the outside ambient pressure is measured at a door jam of the vehicle to lessen the effect of vehicle speed on pressure measurements. In other embodiments, the outside ambient pressure is measured at two door jams of the vehicle, one on each side, and averaged to lessen the effect of side winds on pressure measurements. In yet other embodiments of the invention, the vehicle speed and climate control system setting are used to correct the measurement of compartment pressure so a more accurate error signal can be obtained.

In certain embodiments of the invention, the problem of sudden pressure increases that occur upon door closings is solved. Door position indicators are provided, and the controller overrides any other valve control signal when a vehicle door is open, providing an open signal to the valve. When the door is closed, the open valve provides an escape means for excess compartment air, preventing sudden pressure increases when the door is closed.

In this manner the apparatus of the invention operates to maintain a substantially constant slightly positive pressure in the passenger compartment, relative to the outside ambient pressure, providing additional passenger comfort.

DETAILED DESCRIPTION OF THE DRAWINGS

Figure 1:
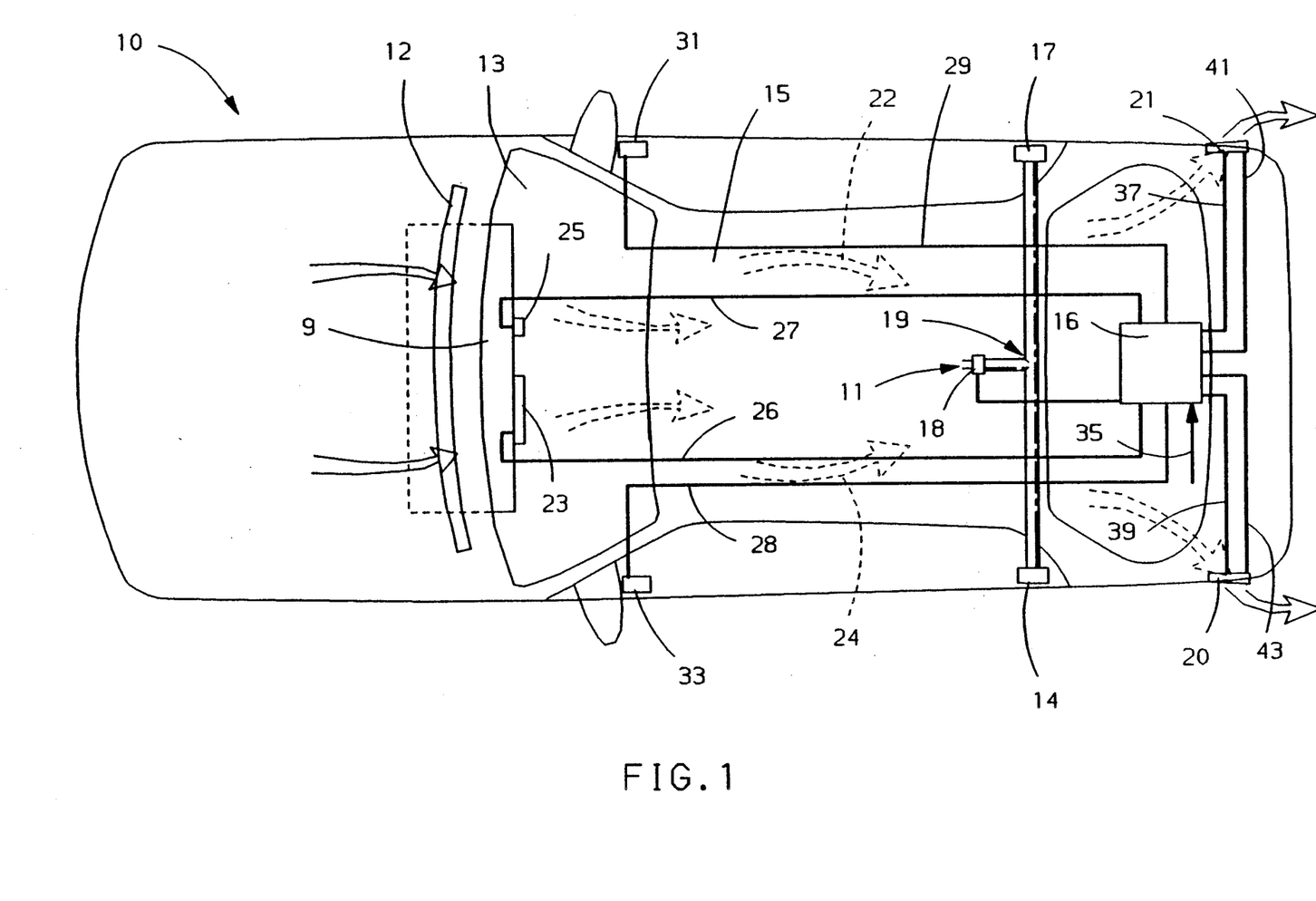
FIG. 1 is a diagram of a complete air pressure control system in a vehicle.

FIG. 1 is a diagram of a complete air pressure control system in a vehicle 10. The vehicle 10 has an air inlet 12 at the base of the windshield 13 which supplies air to the climate control system 9. The climate control system usually contains a separately controlled blower (not shown) which helps force air through the climate control system and into the vehicle. The climate control is controlled by the panel 23 and the blower speed is controlled by the blower control 25. The air flows into the passenger compartment 15 of the vehicle and travels through various flow paths 22 and 24. The amount of air entering the vehicle depends partly on the vehicle velocity. This is because when the vehicle is moving, air may be rammed into the inlet 12. The amount of air entering the vehicle also depends on the climate control system setting, the blower speed, and the passenger compartment pressure of the vehicle. The air flows through the vehicle and out the valves 20 and 21. The flow of air through the valves 20 and 21 is controlled by positioning the valve doors (not shown). The use of two valves, one valve on each side of the vehicle, is the preferred embodiment.

Outside ambient pressure is measured at the pressure reference points 14 and 17. In the preferred embodiment, there are two pressure reference points located at the door jams on each side of the vehicle. The pressure measurements at these two points are then averaged in a Y tube 19, and the result is fed to one side of the pressure transducer 18. The other side of the pressure transducer 18 is open to the passenger compartment (at 11). With this arrangement, the pressure transducer 18 measures the differential between the passenger compartment pressure and the outside ambient pressure.

The controller 16 controls the valves. The inputs to the controller 16 are signals representing the vehicle speed, line 35, climate control setting, line 26, blower speed, line 27, and car door positions, lines 28 and 29. The car door positions are detected at the sensors 31 and 33. In response to these inputs, the controller sends control signals to the valves through lines 37 and 39. The valve positions are fed back to the controller through lines 41 and 43.

Figure 2:
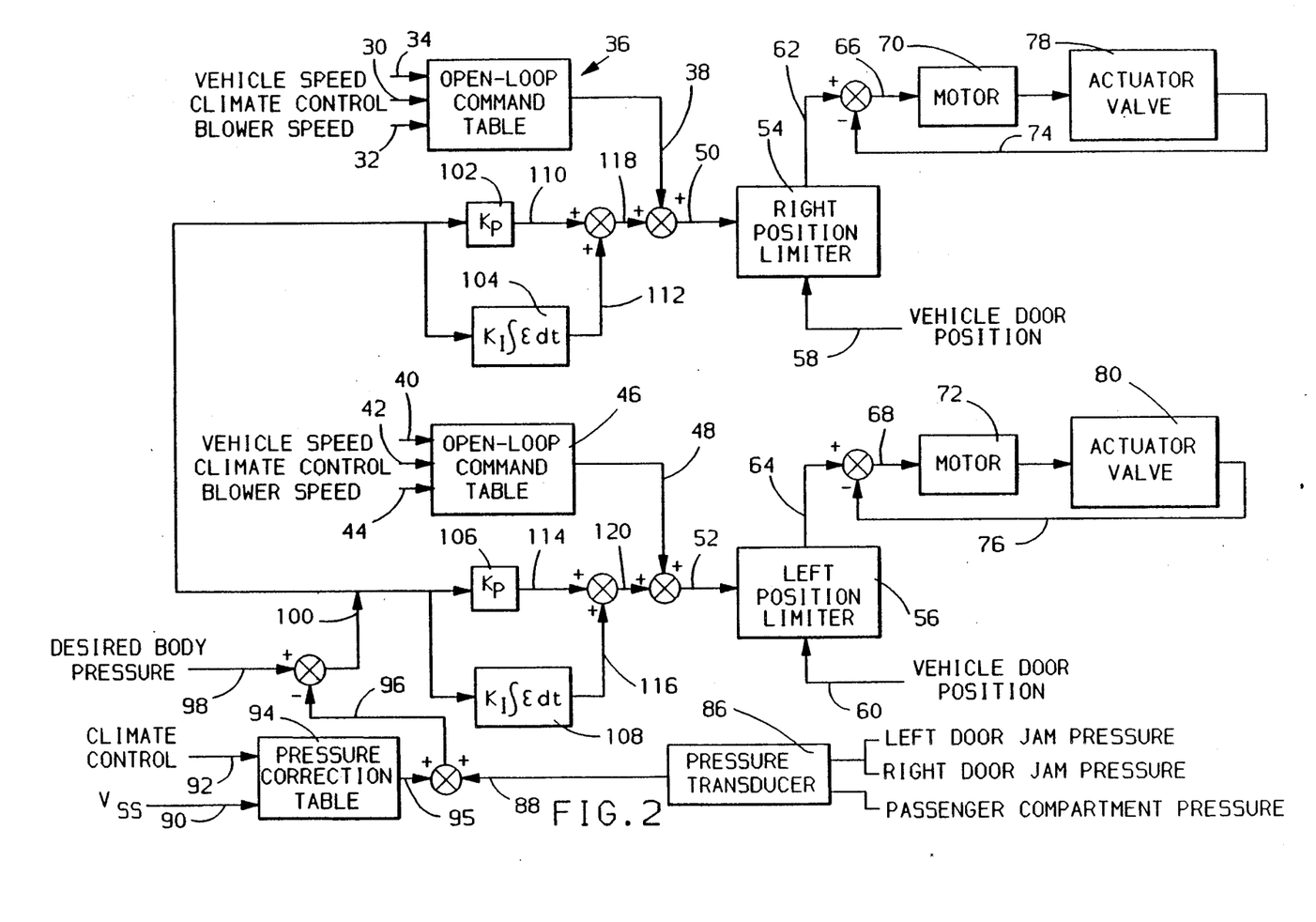
FIG. 2 is a controls diagram of the preferred implementation of the invention.

FIG. 2 is a detailed controls diagram of how the invention, such as the system in FIG. 1, works. The vehicle speed, climate control mode, and blower speed all affect the passenger compartment pressure. Signals representing these parameters are used as inputs to the open-loop command tables 36 and 46 through lines 30, 32 and 34 and lines 40, 42 and 44. The open-loop command tables 36 and 46 are four dimensional look-up tables. In this embodiment, the signal representing the blower speed is proportional to the voltage controlling the blower motor. The open-loop command table 36 provides an open-loop right valve position command on line 38 in response to the three input signals on lines 30, 32 and 34. The open-loop command table 46 provides an open-loop left valve position command on line 48 in response to the three input signals on lines 40, 42 and 44.

The open-loop right valve position command in line 38 is added to the closed-loop error correction signal on line 118 and the resultant right valve position command signal is carried in line 50. The open-loop left valve position command in line 48 is combined with the closed-loop error correction signal on line 120 and the resultant left valve position command signal is carried in line 52.

The boxes designated 54 and 56 represent the position limiters which are used to limit the range of motion of the valves and provide the means to prevent sudden increases in pressure which may occur upon closing of a vehicle door. Line 50 is connected to the right position limiter 54. If the command signal on line 50 is above the maximum or below the minimum valve range values, the right position limiter 54 will set the value of the output signal 62 to the maximum or minimum limit, respectively. If any vehicle door is open, line 58 signals the right position limiter 54 to override the command signal in line 50 and to provide an open valve command in line 62. Similarly, line 52 is connected to the left position limiter 56. If the command signal on line 52 is above the maximum or below the minimum valve range values, the left position limiter 56 will set the value of the output signal 64 to the maximum or minimum limit, respectively. If any vehicle door is open, line 60 signals the left position limiter 56 to override the command signal in line 52 and to provide an open valve command in line 64. By opening the valves when a door is open, the system provides an escape for excess air which is trapped in the vehicle upon the closing of the door. This prevents a sudden increase of the pressure in the vehicle.

The right valve feedback signal in line 74 is subtracted from the right valve command signal in line 62 resulting in the right valve motor control signal in line 66. The right valve motor 70 is controlled by the signal in line 66 and it positions the right valve 78. The right valve motor 70 and the right valve motor control line 66 comprise the right valve control means. Similarly, the left valve feedback signal in line 76 is subtracted from the left valve command signal in line 64 resulting in the left valve motor control signal in line 68. The left valve motor 72 is controlled by the signal in line 68 and it positions the left valve 80. The left valve motor 72 and the left valve motor control line 68 comprise the left valve control means.

Together, the left and right valves control the escape of air from the passenger compartment of the vehicle. By controlling the escape of air from the passenger compartment, the valves control the pressure of the passenger compartment. The pressure in the passenger compartment is measured by the pressure transducer, designated 86 in the controls diagram. The pressure transducer measures the difference between the passenger compartment pressure and the outside pressure. The outside pressure is measured from two door jams of the vehicle. The pressure at the two door jams is averaged at a Y pipe, and the result is fed to one side of the pressure transducer. The other side of the pressure transducer is open to the passenger compartment. The pressure transducer 86 provides a signal on line 88 representing the measured compartment pressure relative to the outside pressure.

Because the vehicle speed affects the accuracy of the measured compartment pressure, a correction is needed. Signals representing the climate control mode and the vehicle speed on lines 92 and 90 are fed into the pressure correction table 94, a three dimensional look-up table. The pressure correction table provides a pressure correction signal on line 95. The pressure correction signal on line 95 is combined with the measured body pressure signal on line 88 to result in an actual body pressure signal in line 96. The actual body pressure in line 96 is compared to the signal in line 98, representing the desired body pressure. A resultant error signal is provided in line 100.

The error signal in line 100 is multiplied by a proportional term, box 102, with the resultant signal provided in line 110. The error signal in line 100 is also integrated, box 104, with the resultant signal on line 112. The signals in lines 110 and 112 are combined to form the closed-loop error correction signal in line 118. This closed-loop error correction signal is combined with the open-loop right valve position command in line 38 as explained above. Similarly, the error signal in line 100 is multiplied by a proportional term, box 106, with the resultant signal provided on line 114. The error signal in line 100 is also integrated, box 108, with the resultant signal in line 116. The signals in lines 114 and 116 are then combined to form the closed-loop error correction signal in line 120. As explained above, the closed-loop error correction signal in line 120 is combined with the open-loop left valve position signal in line 48.

FIGS. 3 through 7 are graphs of sample data for the open-loop command tables 36 and 46. Each of these figures is a plot of valve position, in degrees, verses vehicle speed for a given climate control mode. Each line on a graph represents a different blower speed. In each graph, line A is for the low blower speed setting, line B is for the medium-low blower speed setting, line C is for the medium-high blower speed setting, and line D is for the high blower speed setting. In the example data, when the climate control mode is MAX AC, the valve is closed completely for all speeds. So this climate control mode was not plotted. The MAX AC mode has a closed valve because in this mode the climate control system recirculates the air in the car. In contrast, the other climate control modes circulate outside air through the vehicle.

Figure 3:
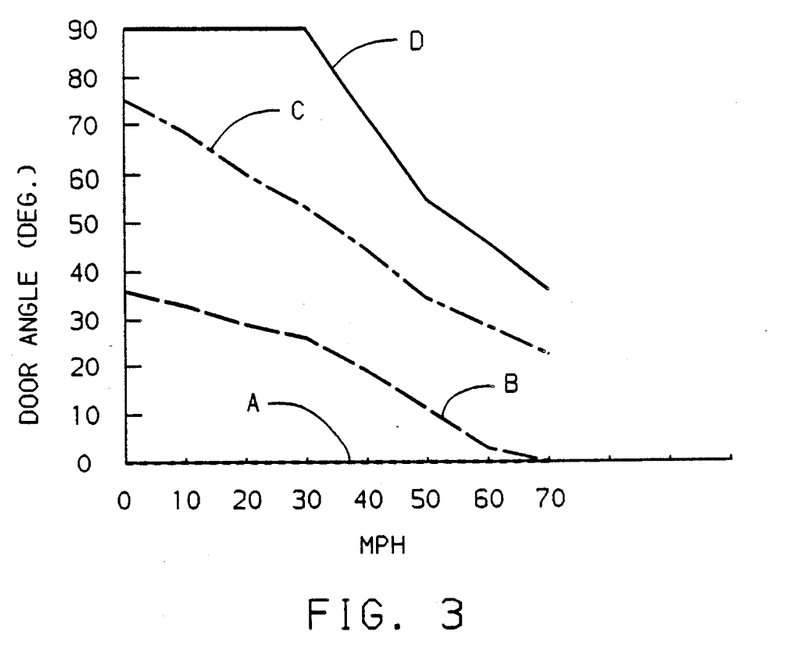
FIGS. 3 through 7 are graphs of example data for the open-loop command look-up table.
Figure 4:
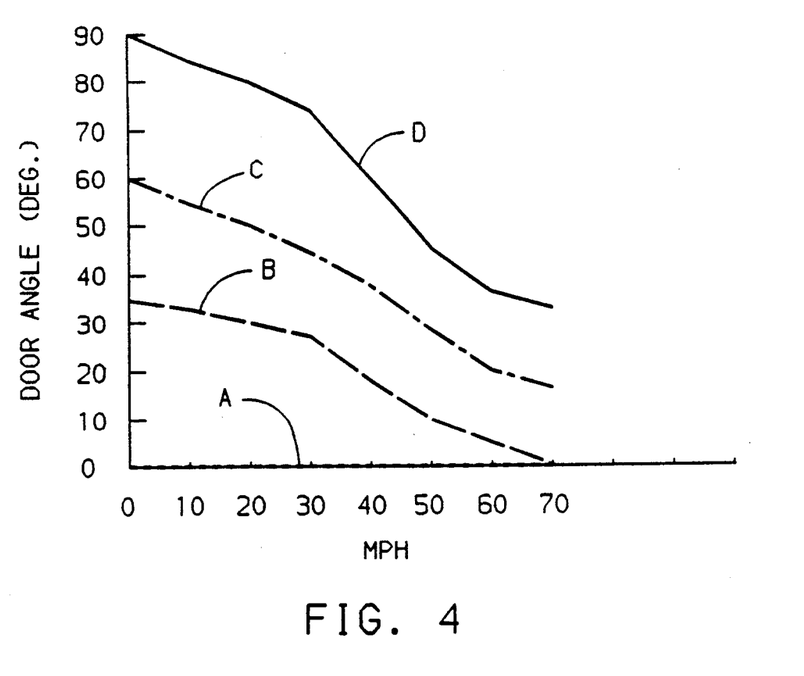
Figure 5:
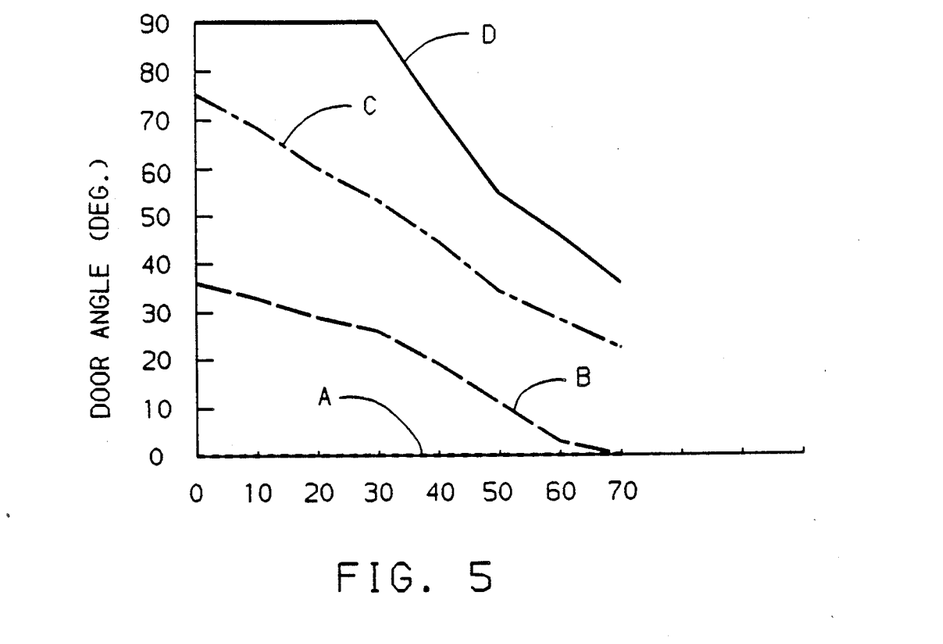
Figure 6:
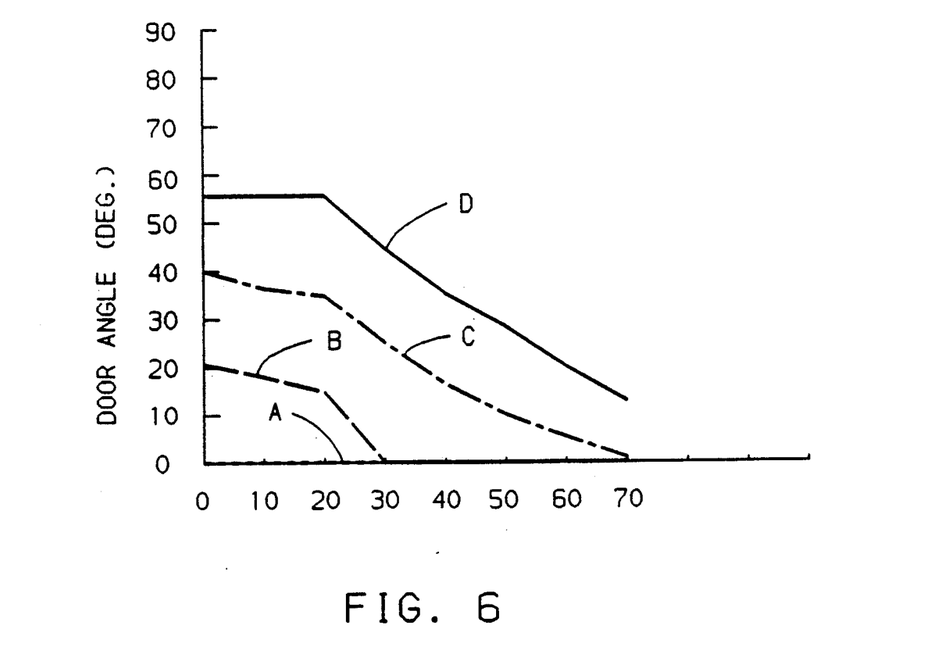
Figure 7:
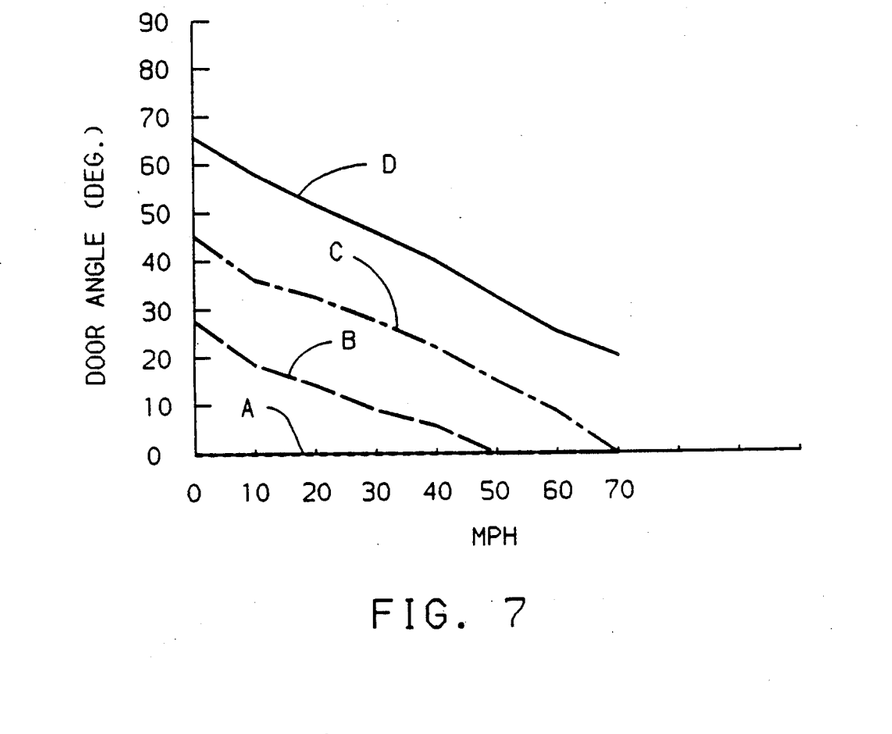

FIG. 3 represents the open-loop command data for the climate control mode of NORM AC with the temperature setting at full cold. The temperature setting affects the flow of air into the passenger compartment. In the preferred embodiment, the data used corresponds to the most common temperature setting for each mode. For example, the most common temperature setting for the climate control mode of NORM AC is full cold. FIG. 4 represents the open-loop command data for the climate control mode of BI-LEVEL AC with the temperature setting at fifty percent between hot and cold. FIG. 5 represents the open-loop command data for the climate control mode of VENT with the temperature setting at full cold. FIG. 6 represents the open-loop command data for the climate control mode of HEATER with the temperature setting at full hot. FIG. 7 represents the open-loop command data for the climate control mode of DEFROST with the temperature setting at full hot.

Figure 8:
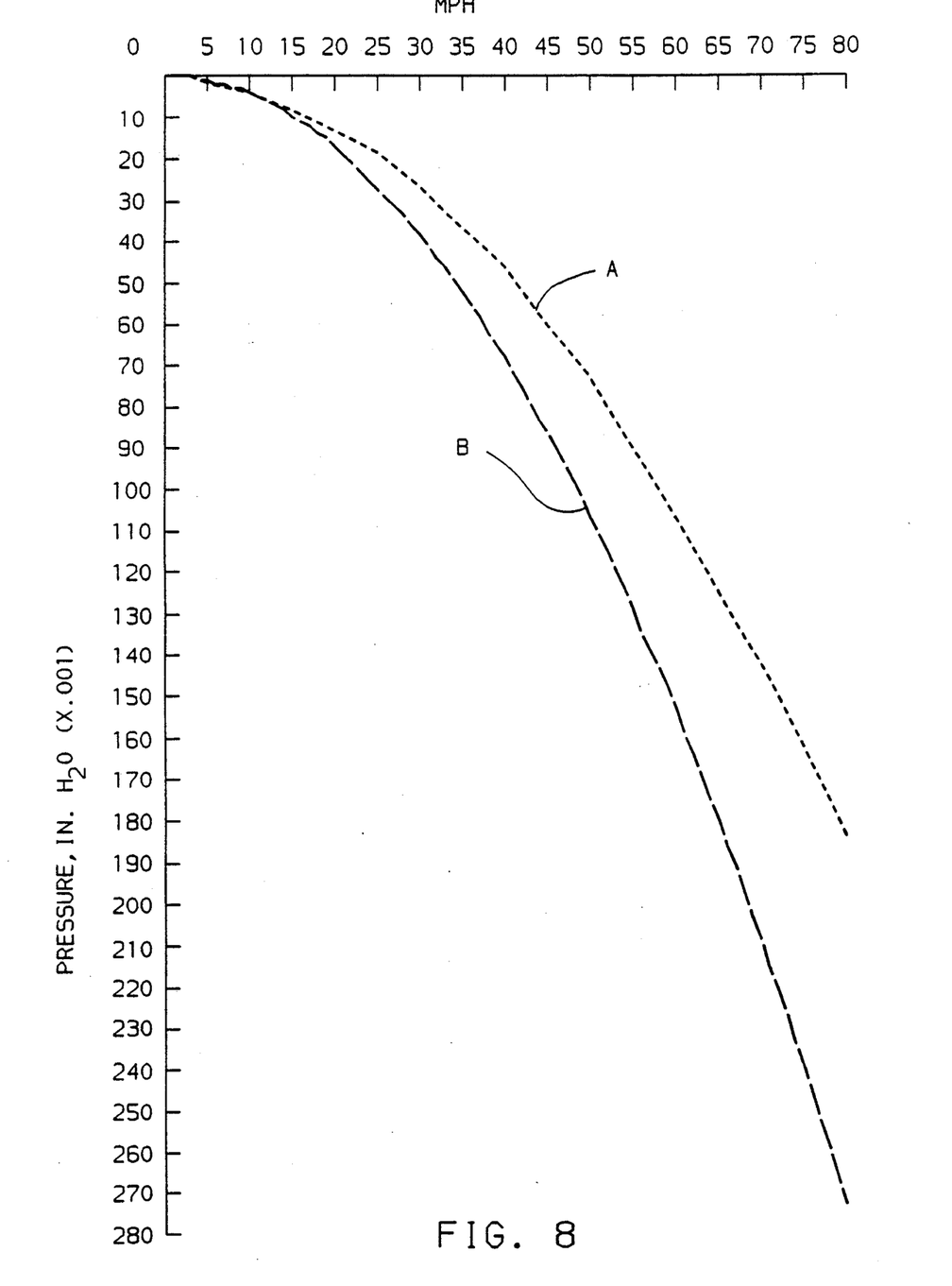
FIG. 8 is a graph of example data for the pressure correction look-up table.

FIG. 8 is a graph of example pressure correction data for the pressure correction table 94. Line B represents the correction data for the MAX AC climate control setting. Line A represents the correction data for all other climate control settings.

The above compartment control system is responsive to the vehicle speed, climate control mode, blower speed, and internal pressure of the vehicle. In the above manner, the illustrated embodiment provides increased comfort for vehicle passengers by providing improved control of the passenger compartment pressure.

While described in reference to the illustrated embodiment, the invention does not need to appear as in the above system. Moreover, various other modifications will occur to those skilled in the art, and systems incorporating those modifications may fall within the scope of this invention which is defined in the claims below.

The embodiments of the invention in which an exclusive property or privilege is claimed are defined as follows:

1. In a pressure control system, for the passenger compartment of a vehicle, having a positionable valve for regulating the compartment air pressure to a desired value, the vehicle containing a climate control system with various settings and a blower with various speeds, the improvement comprising:
    an open-loop means for generating an open-loop valve position command as a function of the climate control system setting, the vehicle speed, and the blower speed;
    a closed-loop means for measuring the actual compartment air pressure, comparing that pressure to the desired value to form an error signal, and developing a closed-loop correction term in accordance with the error signal; and
    a valve control means for positioning the valve as a combined function of the open-loop valve position command and the closed-loop correction term.

2. The apparatus in claim 1 wherein the open-loop means includes a four dimensional look-up table responsive to the climate control system setting, the vehicle speed, and the blower speed.

3. The apparatus in claim 1 wherein the actual compartment air pressure is determined as a function of the measured compartment pressure and a pressure correction term which depends upon the vehicle speed and the climate control mode.

4. The apparatus in claim 3 wherein the pressure correction term is determined by a means including a three dimensional look-up table.

5. The apparatus in claim 1 wherein the actual compartment air pressure is determined as a function of the pressure differential between the passenger compartment pressure and the outside ambient pressure.

6. The apparatus in claim 5 wherein the outside ambient pressure is the average of the outside ambient pressure on each side of the vehicle.

7. The apparatus of claim 6 wherein the outside ambient pressure on each side of the vehicle is measured at a door jam on each side.

8. The apparatus in claim 1 additionally comprising a door position indicator for each door and an override function in the control means that, in response to the door position indicators, overrides the open-loop valve position command and the closed-loop correction term to open the valve in response to an indication that any door is open, thereby preventing a sudden pressure increase when the door is closed.

9. The apparatus in claim 1 wherein the closed-loop correction term comprises an integral and a proportional term.

10. In a pressure control system, for the passenger compartment of a vehicle, having two positionable valves for regulating the compartment air pressure to a desired value, the vehicle containing a climate control system with various settings and a blower with various speeds, the improvement comprising:
    an open-loop means for each valve, each generating an open-loop valve position command as a function of the climate control system setting, the vehicle speed, and the blower speed;
    a measuring means for determining the actual compartment pressure; and
    a valve control means for each valve, each positioning a valve responsive to an open-loop position command and the difference between the actual compartment pressure and the desired value.

11. The apparatus in claim 10 wherein each open-loop means includes a four dimensional look-up table responsive to the climate control system setting, the vehicle speed, and the blower speed.

12. The apparatus in claim 10 wherein the actual compartment air pressure is determined as a function of the measured compartment pressure and a pressure correction term which depends upon the vehicle speed and the climate control mode.

13. The apparatus in claim 12 wherein the pressure correction term is determined by a means including a three dimensional look-up table.

14. The apparatus in claim 10 wherein the actual compartment air pressure is determined as a function of the pressure differential between the passenger compartment pressure and the outside ambient pressure.

15. The apparatus in claim 14 wherein the outside ambient pressure is the average of the outside ambient pressure on each side of the vehicle.

16. The apparatus of claim 15 wherein the outside ambient pressure on each side of the vehicle is measured at a door jam on each side.

17. The apparatus in claim 10 additionally comprising a door position indicator for each door and an override function in each control means that, in response to the door position indicators, opens the valve when any door is open, thereby preventing a sudden pressure increase when the door is closed.

18. The apparatus in claim 10 wherein each valve control means includes a control signal comprised of an integral and a proportional term.

19. In a pressure control system, for the passenger compartment of a vehicle, having a positionable valve for regulating the compartment air pressure to a desired value, the vehicle containing a climate control system with various settings and a blower with various speeds, the improvement comprising:

an open-loop means, including a four dimensional look-up table, for generating an open-loop valve position command as a function of the climate control system setting, the vehicle speed, and the blower speed;

a closed-loop means using a determination of actual compartment pressure made in response to the measured compartment pressure and a pressure correction term which, using a three dimensional look-up table, depends upon the vehicle speed and the climate control mode, the measured compartment pressure being determined as a function of the pressure differential between the passenger compartment pressure and the average of the outside ambient pressure measured on each side of the vehicle at the door jams, the closed-loop means comparing that pressure to the desired value to form an error signal and developing a closed-loop correction term, with integral and proportional elements, in accordance with the error signal;

a door position indicator for each door; and a valve control means for positioning the valve as a combined function of the open-loop valve position command and the closed-loop correction term, the valve control means also having an override function that, in response to the door position indicators, overrides the open-loop valve position command and the closed-loop correction term to open the valve in response to an indication that any door is open, thereby preventing a sudden pressure increase when the door is closed.

20. In a pressure control system, for the passenger compartment of a vehicle, having two positionable valves for regulating the compartment air pressure to a desired value, the vehicle containing a climate control system with various settings and a blower with various speeds, the improvement comprising:

an open-loop means for each valve, each including a four dimensional look-up table, and each generating an open-loop valve position command as a function of the climate control system setting, the vehicle speed, and the blower speed;

a measuring means for determining the actual compartment pressure in response to the measured compartment pressure and a pressure correction term which, using a three dimensional look-up table, depends upon the vehicle speed and the climate control system setting, the measured compartment pressure being determined as a function of the pressure differential between the passenger compartment pressure and the average of the outside ambient pressure measured on each side of the vehicle at the door jams;

a door position indicator for each door; and a valve control means for each valve, each positioning a valve in response to the combined function of an open-loop valve position command and the difference between the actual compartment pressure and the desired value, each valve control means also having an override function that, in response to the door position indicators, opens the valve when any door is open, thereby preventing a sudden pressure increase when the door is closed.

* * * * *